US012631211B2

(12) United States Patent
Sasaki

(10) Patent No.: US 12,631,211 B2
(45) Date of Patent: May 19, 2026

(54) BEARING

(71) Applicant: NIPPON THOMPSON CO., LTD.,
Tokyo (JP)

(72) Inventor: Satoshi Sasaki, Mino (JP)

(73) Assignee: NIPPON THOMPSON CO., LTD.,
Tokyo (JP)

( * ) Notice: Subject to any disclaimer, the term of this
patent is extended or adjusted under 35
U.S.C. 154(b) by 73 days.

(21) Appl. No.: 18/709,544

(22) PCT Filed: Oct. 7, 2022

(86) PCT No.: PCT/JP2022/037679
§ 371 (c)(1),
(2) Date: May 13, 2024

(87) PCT Pub. No.: WO2023/084964
PCT Pub. Date: May 19, 2023

(65) Prior Publication Data
US 2025/0012319 A1     Jan. 9, 2025

(30) Foreign Application Priority Data

Nov. 15, 2021     (JP) ................................. 2021-185564

(51) Int. Cl.
*F16C 19/38*         (2006.01)
*F16C 19/40*         (2006.01)
*F16C 33/37*         (2006.01)
(52) U.S. Cl.
CPC .............. *F16C 19/38* (2013.01); *F16C 19/40*
(2013.01); *F16C 33/3706* (2013.01)

(58) Field of Classification Search
CPC .......... F16C 19/38; F16C 19/40; F16C 33/37;
F16C 33/3706; F16C 33/3713
See application file for complete search history.

(56) References Cited

U.S. PATENT DOCUMENTS 3,790,239  A      2/1974  Laux et al.
4,293,166  A  *  10/1981  Ernst .................... F16C 33/3713
                                                     384/45
(Continued)

FOREIGN PATENT DOCUMENTS

FR            744081  A      4/1933
JP       S59-001928  U      1/1984
(Continued)

OTHER PUBLICATIONS

Dec. 20, 2022 International Search Report issued in International
Patent Application No. PCT/JP2022/037679.
(Continued)

*Primary Examiner* — James Pilkington
(74) *Attorney, Agent, or Firm* — Oliff PLC

(57)         ABSTRACT
A bearing includes: a plurality of cylindrical rollers arranged
in a circumferential direction; and a separator adjacent to the
cylindrical rollers in the circumferential direction. The sepa-
rator has a cylindrical shape. An outer peripheral surface of
the separator has an annular groove defined by a groove wall
surface, a shape of the groove wall surface in a cross section
including a center axis being an arc shape. The separator is
oriented such that the groove wall surface contacts outer
peripheral surfaces of the cylindrical rollers adjacent to
separator in the circumferential direction. The groove wall
surface has a curvature radius larger than a curvature radius
of the outer peripheral surface of each cylindrical roller.

8 Claims, 4 Drawing Sheets

(56)        References Cited

U.S. PATENT DOCUMENTS

| | | | | |
|---|---|---|---|---|
| 4,479,683 | A | 10/1984 | Kanamaru | |
| 4,799,807 | A | 1/1989 | Kuroiwa | |
| 4,799,809 | A | 1/1989 | Kuroiwa | |
| 4,915,513 | A | 4/1990 | Orain | |
| 9,482,279 | B2 * | 11/2016 | Ovize | ..................... F16C 19/38 |
| 9,995,340 | B2 * | 6/2018 | Ovize | .................. F16C 19/361 |
| 2009/0297081 | A1 | 12/2009 | Kunimoto et al. | |
| 2018/0291951 | A1 | 10/2018 | Yasuda | |

FOREIGN PATENT DOCUMENTS

| | | | |
|---|---|---|---|
| JP | S63-270916 | A | 11/1988 |
| JP | 2003-148479 | A | 5/2003 |
| JP | 2006-022864 | A | 1/2006 |
| JP | 2009-287587 | A | 12/2009 |
| JP | 2012-47218 | A | 3/2012 |
| JP | 2016-023707 | A | 2/2016 |
| JP | 2018-179078 | A | 11/2018 |

OTHER PUBLICATIONS

Feb. 11, 2025 Search Report issued in European Patent Application
No. 22892464.3.
Feb. 6, 2026 Office Action issued in Taiwanese Patent Application
No. 111142103.

\* cited by examiner

BEARING

TECHNICAL FIELD

The present disclosure relates to a bearing. This application claims priority to Japanese Patent Application No. 2021-185564, which was filed on Nov. 15, 2021, and is incorporated herein by reference in its entirety.

BACKGROUND ART

A bearing known to date includes an inner ring whose outer peripheral surface has an inner raceway surface, an outer ring whose inner peripheral surface has an outer raceway surface facing the inner raceway surface, a plurality of rolling elements arranged in a circumferential direction in an annular rolling path along the inner raceway surface and the outer raceway surface, and a separator located between adjacent ones of the rolling elements adjacent to each other in the circumferential direction. Techniques of this type are disclosed in, for example, Patent Literature 1 and Patent Literature 2.

Patent Literature 1 discloses a cross-roller bearing in which rollers as rolling elements and separators are alternately arranged in the circumferential direction in the rolling path. Patent Literature 2 discloses a ball bearing in which balls as rolling elements and cylindrical separators are alternately arranged in the circumferential direction in the rolling path.

CITATION LIST

Patent Literatures

Patent Literature 1: Japanese Patent Application Laid-Open No. 2009-287587
Patent Literature 2: Japanese Patent Application Laid-Open No. 2006-22864

SUMMARY OF INVENTION

Technical Problem

In the bearings disclosed in Patent Literature 1 and Patent Literature 2, damage such as indentation might occur on the surface of the separators because of contact with the rolling elements. Thus, conventional bearings are susceptible to improvement in reducing damage of separators caused by contact with rolling elements.

It is therefore an object of the present disclosure to provide a bearing capable of reducing damage of a separator.

Solution to Problem

A bearing according present disclosure includes: a first raceway member whose outer peripheral surface includes an annular first raceway surface; a second raceway member whose inner peripheral surface includes an annular second raceway surface facing the first raceway surface; a plurality of cylindrical rollers arranged in a circumferential direction such that the cylindrical rollers contact the first raceway surface and the second raceway surface in an annular rolling path along the first raceway surface and the second raceway surface; and a separator adjacent to the cylindrical rollers in the circumferential direction. The separator has a cylindrical shape. An outer peripheral surface of the separator has an annular groove. The groove is defined by a groove wall surface, and a shape of the groove wall surface in a cross section including a center axis being an arc shape. The separator is oriented such that the groove wall surface contacts outer peripheral surfaces of the cylindrical rollers adjacent to the separator in the circumferential direction. The groove wall surface has a curvature radius larger than a curvature radius of the outer peripheral surface of each cylindrical roller.

Effects of the Invention

The present disclosure can provide a bearing capable of reducing damage of a separator.

BRIEF DESCRIPTION OF DRAWINGS

FIG. 1 is a perspective view illustrating an entire configuration of a bearing according to an embodiment.
FIG. 2 is a cross-sectional view along a radial direction of the bearing according to the embodiment.

DESCRIPTION OF EMBODIMENTS

Summary of Embodiment

Figure 3:
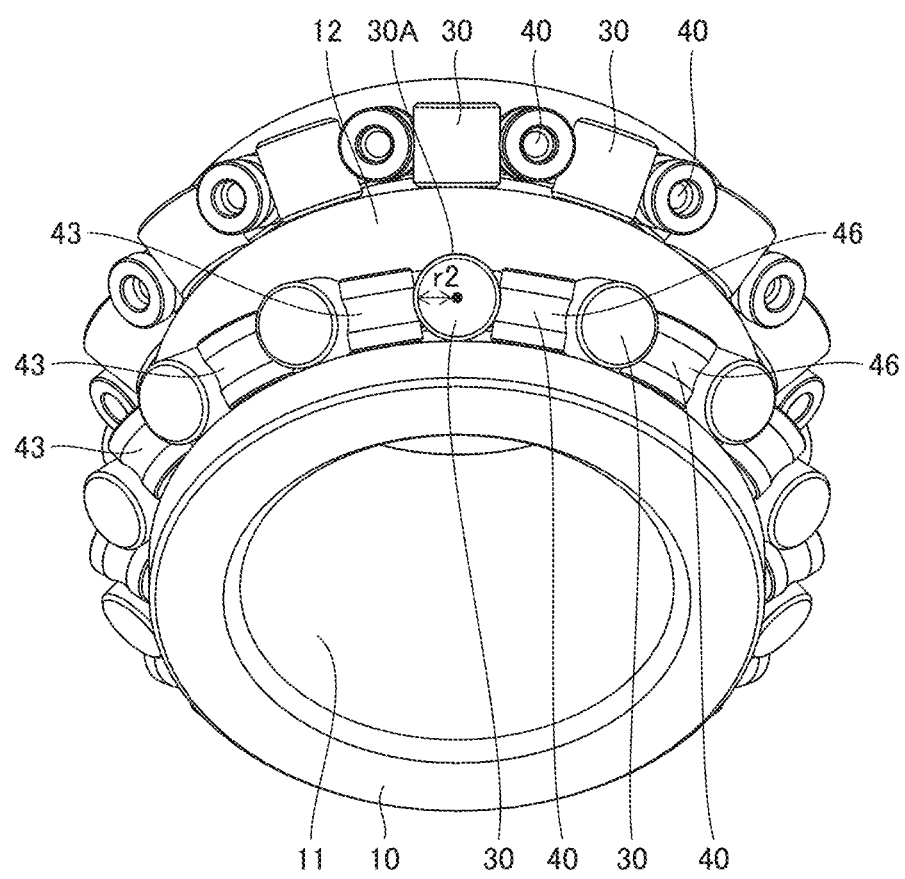
FIG. 3 is a perspective view illustrating a state where a second raceway member is detached in the bearing according to the embodiment.

A bearing according to the present disclosure includes: a first raceway member whose outer peripheral surface includes an annular first raceway surface; a second raceway member whose inner peripheral surface includes an annular second raceway surface facing the first raceway surface; a plurality of cylindrical rollers arranged in a circumferential direction such that the cylindrical rollers contact the first raceway surface and the second raceway surface in an annular rolling path along the first raceway surface and the second raceway surface; and a separator adjacent to the cylindrical rollers in the circumferential direction. The separator has a cylindrical shape. An outer peripheral surface of the separator has an annular groove. The groove is defined by a groove wall surface, and a shape of the groove wall surface in a cross section including a center axis being an arc shape. The separator is oriented such that the groove wall surface contacts outer peripheral surfaces of the cylindrical rollers adjacent to the separator in the circumferential direction. The groove wall surface has a curvature radius larger than a curvature radius of the outer peripheral surface of each cylindrical roller.

In the bearing, the curvature radius of the groove wall surface of the separator is larger than the curvature radius of the outer peripheral surface of each the cylindrical roller. Accordingly, as compared to a case where the curvature radius of the groove wall surface is equal to the curvature radius of the outer peripheral surface of each cylindrical roller, it is possible to suppress occurrence of damage such as indentation on the groove wall surface of the separator due to contact with the cylindrical rollers. Thus, the bearing can reduce damage of the separator as compared to conventional bearings.

In the bearing, in a cross section of the separator including the center axis, the separator may include a first corner, and a second corner located on a diagonal line of the separator with respect to the first corner. In the cross section of the separator including the center axis, a length of the diagonal line may be greater than or equal to an outer diameter of the separator. This configuration can reduce falling down of the separator, as compared to a case where the length of the diagonal line is less than the outer diameter of the separator.

In the bearing, the first raceway surface may include a first contact surface to contact the outer peripheral surfaces of the cylindrical rollers, and a second contact surface to contact end surfaces of the cylindrical rollers, the second contact surface being continuous with the first contact surface in an inner end of the first contact surface and being orthogonal to the first contact surface. The second raceway surface may include a third contact surface to contact the outer peripheral surfaces of the cylindrical rollers, and a fourth contact surface to contact end surfaces of the cylindrical roller, the fourth contact surface being continuous with the third contact surface in an inner end of the third contact surface and being orthogonal to the third contact surface. The cylindrical rollers may be disposed at both sides of the separator in the circumferential direction. The separator may be sandwiched between the cylindrical rollers disposed at both sides of the separator in the circumferential direction with the groove wall surface being in contact with the cylindrical rollers such that the outer peripheral surface faces the fourth contact surface and is separated from the second contact surface, a first end surface of the separator in a direction in which the center axis extends faces the first contact surface, and a second end surface opposite to the first end surface faces the third contact surface. This configuration can reduce wear of the separator caused by contact with the raceway.

In the bearing, the plurality of cylindrical rollers may be arranged in a plurality of lines separated from one another in a width direction.

Specific Examples of Embodiment

A specific embodiment of a bearing according to the present disclosure will be described hereinafter with reference to the drawings. In the following drawings, the same or corresponding parts are denoted by the same reference numerals, and the description thereof will not be repeated.

Figure 1:
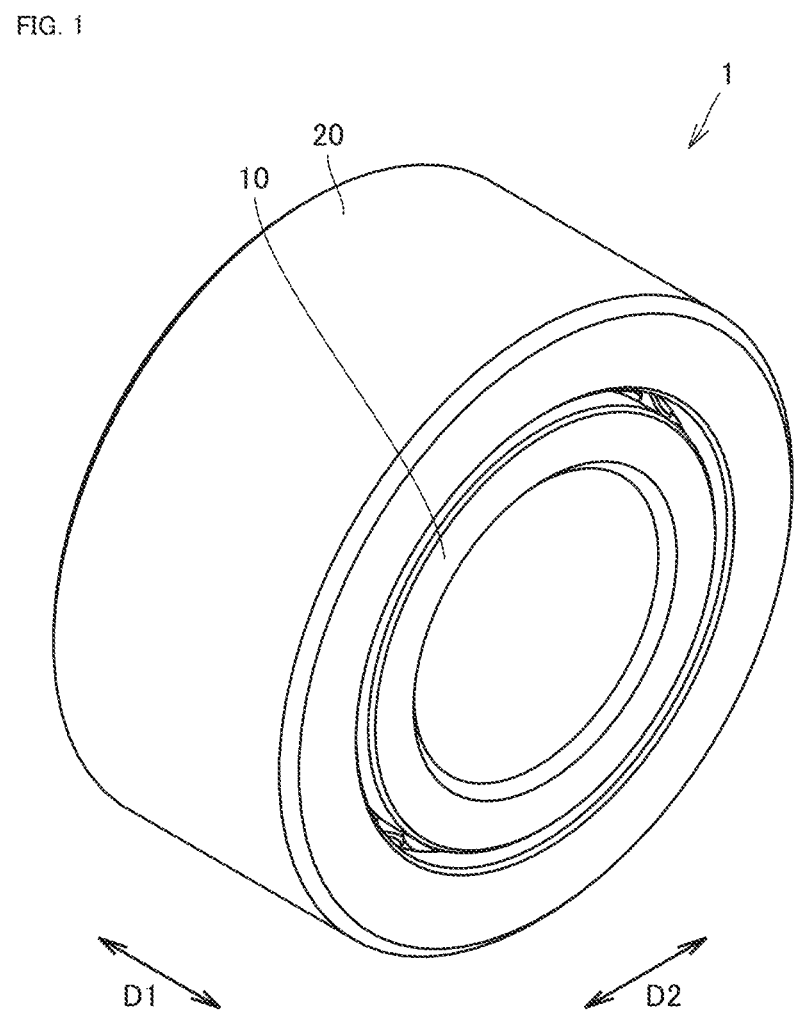
Figure 2:
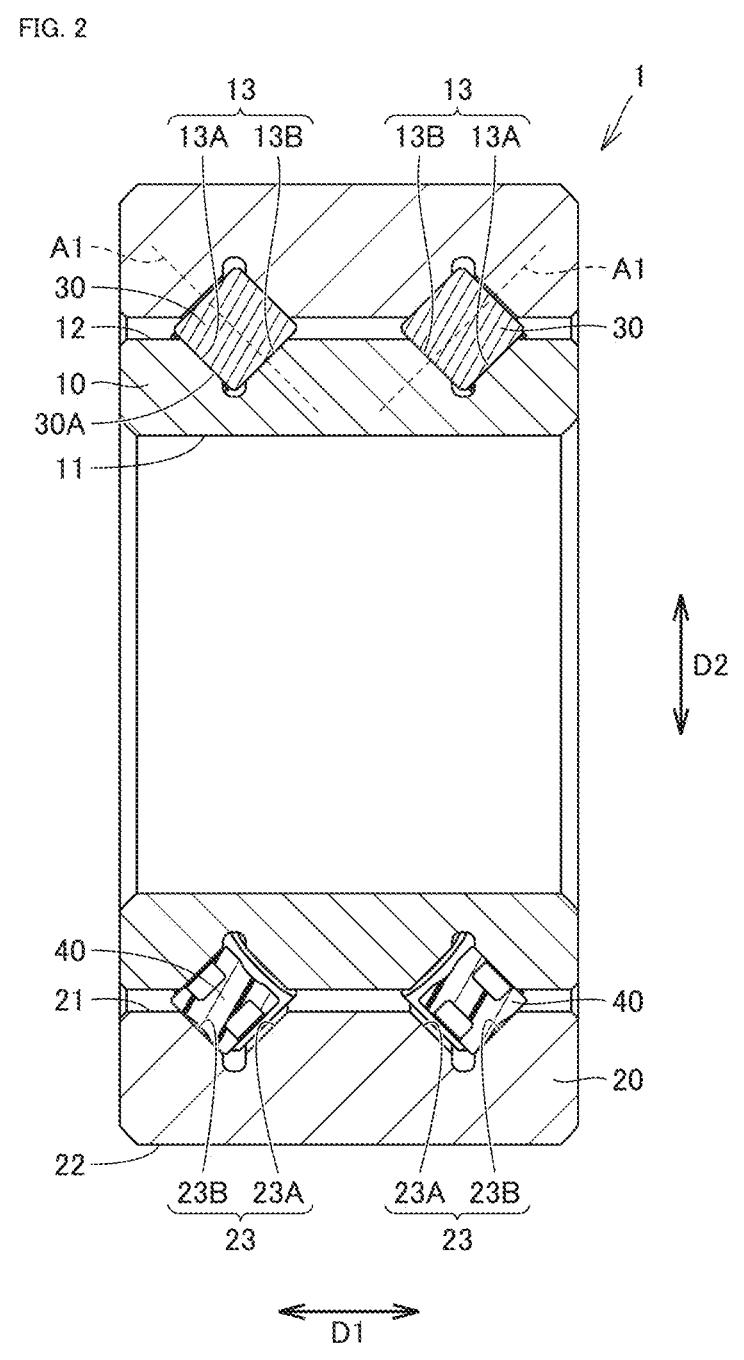
Figure 4:
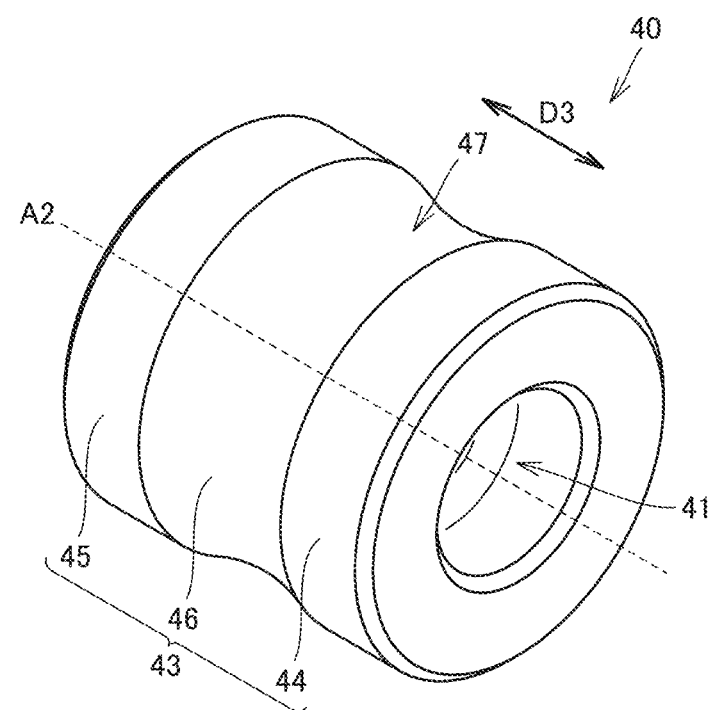
FIG. 4 is a perspective view illustrating an entire configuration of a separator according to the embodiment.
Figure 5:
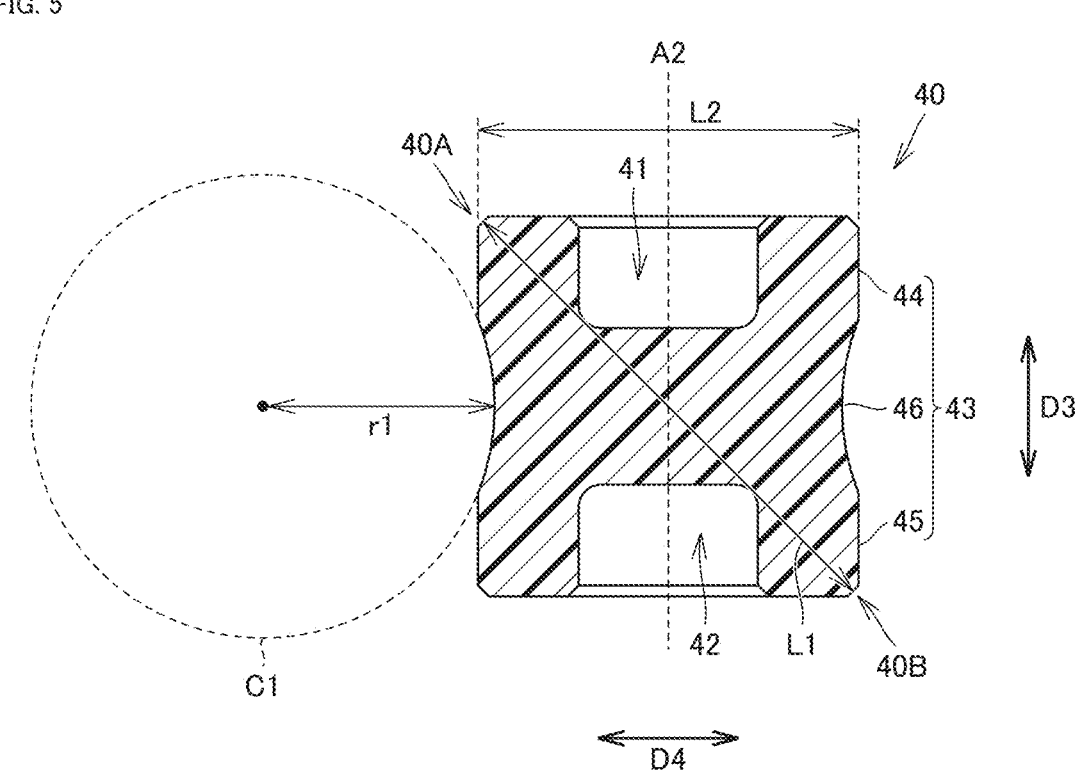
FIG. 5 is a cross-sectional view including a center axis of the separator according to the embodiment.

First, a configuration of a bearing 1 according to this embodiment will be described with reference to FIGS. 1 through 5. FIG. 1 is a perspective view illustrating an entire configuration of the bearing 1. FIG. 2 is a cross-sectional view along a radial direction D2 of the bearing 1. FIG. 3 is a perspective view illustrating a state where a second raceway member 20 (outer ring) is detached in the bearing 1. FIG. 4 is a perspective view illustrating an entire configuration of a separator 40. FIG. 5 is a cross-sectional view including a center axis of the separator 40.

The bearing 1 is a rolling bearing including a plurality of cylindrical rollers 30 as rolling elements. As illustrated in FIG. 1, the bearing 1 according to this embodiment mainly includes a first raceway member 10 (inner ring) having an annular shape, and a second raceway member 20 (outer ring) having an annular shape whose diameter is larger than that of the first raceway member 10 and surrounding the first raceway member 10. A length of the first raceway member 10 in a width direction D1 is approximately equal to a length of the second raceway member 20 in the width direction D1.

As illustrated in FIG. 2, the first raceway member 10 includes an annular first inner peripheral surface 11, and an annular first outer peripheral surface 12 facing in a direction opposite to the first inner peripheral surface 11 in the radial direction D2. The first raceway member 10 has annular first raceway surfaces 13 in the first outer peripheral surface 12. In this embodiment, the plurality of (two) first raceway surfaces 13 are separated from each other in the width direction D1, but the present disclosure is not limited to this example. The first raceway surfaces 13 may be formed in a single line.

Each of the first raceway surfaces 13 includes a first contact surface 13A, and a second contact surface 13B continuous with the first contact surface 13A at an inner end of the first contact surface 13A. As illustrated in FIG. 2, in a cross section along the radial direction D2 of the bearing 1, the second contact surface 13B is orthogonal to the first contact surface 13A, and defines a V-shaped groove with the first contact surface 13A. The first contact surface 13A and the second contact surface 13B are connected at the bottom of the groove. As illustrated in FIG. 2, the first contact surface 13A and the second contact surface 13B in this embodiment are tilted at an angle of about 45° with respect to both the width direction D1 and the radial direction D2 in the cross section along the radial direction D2 of the bearing 1. The outer peripheral surface of each cylindrical roller 30 contacts the first contact surface 13A. A first end surface of each cylindrical roller 30 in a direction in which a first center axis A1 (rolling axis) extends contacts the second contact surface 13B.

As illustrated in FIG. 2, the second raceway member 20 includes an annular second inner peripheral surface 21, and an annular second outer peripheral surface 22 facing in a direction opposite to the second inner peripheral surface 21 in the radial direction D2. The second raceway member 20 has annular second raceway surfaces 23 in the second inner peripheral surface 21. Each of the second raceway surfaces 23 surrounds a corresponding one of the first raceway surfaces 13 and faces the first raceway surface 13 in the radial direction D2.

Each of the second raceway surfaces 23 includes a third contact surface 23A, and a fourth contact surface 23B continuous with the third contact surface 23A at an outer end of the third contact surface 23A. As illustrated in FIG. 2, in the cross section along the radial direction D2 of the bearing 1, the fourth contact surface 23B is orthogonal to the third contact surface 23A, and defines a V-shaped groove with the third contact surface 23A. The third contact surface 23A and the fourth contact surface 23B are connected at the bottom of the groove. As illustrated in FIG. 2, the third contact surface 23A and the fourth contact surface 23B in this embodiment are tilted at an angle of about 45° with respect to both the width direction D1 and the radial direction D2 in the cross section along the radial direction D2 of the bearing 1. The outer peripheral surface of each cylindrical roller 30 contacts the third contact surface 23A. A second end surface (end surface opposite to the first end surface) of each cylindrical roller 30 in the direction in which the first center axis A1 extends contacts the fourth contact surface 23B.

As illustrated in FIG. 2, the third contact surfaces 23A in this embodiment are parallel to the first contact surfaces 13A in the cross section along the radial direction D2 of the bearing 1. On the other hand, the fourth contact surfaces 23B in this embodiment are parallel to the second contact surfaces 13B in the cross section along the radial direction D2 of the bearing 1.

An annular rolling path (space) along the first raceway surfaces 13 and the second raceway surfaces 23 is formed between the first raceway member 10 and the second raceway member 20. As illustrated in FIG. 2, the bearing 1 includes the plurality of cylindrical rollers 30 that are arranged in the circumferential direction to contact the first raceway surfaces 13 and the second raceway surfaces 23 in the rolling path.

Each of the cylindrical rollers 30 includes an imaginary first center axis A1 and an annular outer peripheral surface 30A surrounding the first center axis A1. As illustrated in FIG. 2, the first center axis A1 of each cylindrical roller 30 in this embodiment is tilted at about 45° with respect to both the width direction D1 and the radial direction D2 in the cross section along the radial direction D2 of the bearing 1.

In this embodiment, the plurality of cylindrical rollers 30 are arranged in a plurality of lines (first annular line and second annular line) separated from each other in the width direction D1. In each of the annular lines, the first center axes A1 of the cylindrical rollers 30 are oriented in the same direction. On the other hand, as illustrated in FIG. 2, in the cross section along the radial direction D2 of the bearing 1, the first center axes A1 of the cylindrical rollers 30 constituting the first annular line (left cylindrical rollers 30 in FIG. 2, hereinafter also referred to as "first cylindrical rollers") are orthogonal to the first center axes A1 of the cylindrical rollers 30 constituting the second annular line (right cylindrical rollers 30 in FIG. 2, hereinafter also referred to as "second cylindrical rollers"). More specifically, the first contact surfaces 13A (left first contact surfaces 13A in FIG. 2) that contact the outer peripheral surfaces of the first cylindrical rollers are orthogonal to the first contact surfaces 13A (right first contact surfaces 13A in FIG. 2) that contact the outer peripheral surfaces of the second cylindrical rollers.

The bearing 1 further includes a plurality of separators 40 arranged adjacent to the cylindrical rollers 30 in the circumferential direction (FIG. 3). As illustrated in FIG. 3, the cylindrical rollers 30 and the separators 40 in this embodiment are alternately arranged in the entire circumferential direction of the first outer peripheral surface 12. That is, the cylindrical rollers 30 are disposed at both sides of each separator 40 in the circumferential direction. As illustrated in FIG. 3, the cylindrical rollers 30 and the separators 40 adjacent to each other in the circumferential direction are in contact with each other. The cylindrical rollers 30 and the separators 40 are arranged such that the center axes of the cylindrical rollers 30 and the center axes of the separator 40 are orthogonal to each other.

As illustrated in FIGS. 4 and 5, each of the separators 40 has a cylindrical shape and includes an imaginary second center axis A2 and an annular outer peripheral surface 43 surrounding the second center axis A2. Dimensions of the separators 40 in this embodiment are smaller in both the radial direction and the axial direction than those of the cylindrical rollers 30. As illustrated in FIG. 5, a first recess 41 and a second recess 42 are formed on both end surfaces of each separator 40 in an axial direction D3. The first recess 41 and the second recess 42 in this embodiment are circular when seen in the axial direction D3. As illustrated in FIG. 5, bottoms of the first recess 41 and the second recess 42 in this embodiment are located closer to the end surfaces of the separator 40 than a center portion of the separator 40 in the axial direction D3. However, the present disclosure is not limited to this example. As illustrated in FIG. 3, the separators 40 contact the outer peripheral surfaces 30A of the cylindrical rollers 30 adjacent to the separators 40 in the circumferential direction, and the second center axes A2 (FIG. 4) of the separators 40 are orthogonal to the first center axes A1 (FIG. 2) of the cylindrical rollers 30 adjacent to the separators 40 in the circumferential direction. The "cylindrical shape" of each separator may be a shape in which the recess is formed on the end surface as described in this embodiment, or it may be a shape in which no such recess is formed. The wall surfaces of the first recess 41 and the second recess 42 may be tapered, and/or the bottom surfaces of the first recess 41 and the second recess 42 may be semi-spherical. The first recess 41 and the second recess 42 may be continuous with each other in the axial direction D3.

As illustrated in FIGS. 4 and 5, in each of the separators 40, an annular groove 47 is formed on the outer peripheral surface 43. The groove 47 is defined by a groove wall surface 46. The shape of the groove wall surface 46 in a cross section including the second center axis A2 is an arc shape bulging inward in a radial direction D4. The groove wall surface 46 in this embodiment is a toroidal surface. The outer peripheral surface 43 of each separator 40 includes a first annular surface 44, a second annular surface 45, and the groove wall surface 46 located between the first annular surface 44 and the second annular surface 45 in the axial direction D3.

The first annular surface 44 and the second annular surface 45 are annular surfaces surrounding the second center axis A2. As illustrated in FIG. 5, in the cross section including the second center axis A2, the first annular surface 44 and the second annular surface 45 are parallel to the axial direction D3. The bottom of the groove wall surface 46 is located inward of the first annular surface 44 and the second annular surface 45 in the radial direction D4 in the cross section including the second center axis A2. The groove wall surface 46 is formed in the entire circumferential direction of the separator 40. As illustrated in FIG. 3, the separators 40 are oriented such that the outer peripheral surfaces 43 face the outer peripheral surfaces 30A of the cylindrical rollers 30 and the groove wall surfaces 46 contact the outer peripheral surfaces 30A of the cylindrical rollers 30 adjacent to the separators 40 in the circumferential direction.

FIG. 5 shows an imaginary circle C1 in which the groove wall surface 46 constitutes part of the circumference. A curvature radius r1 of the groove wall surface 46 in the cross section of the separator 40 including the second center axis A2 is larger than a curvature radius r2 of the outer peripheral surface 30A of the cylindrical roller 30 (FIG. 3). The curvature radius r1 of the groove wall surface 46 is substantially uniform over the entire circumferential direction of the separator 40. Thus, the outer peripheral surface 30A of the cylindrical roller 30 does not contact the entire groove wall surface 46 of the separator 40, and partially contacts the groove wall surface 46.

As illustrated in FIG. 5, in the cross section including the second center axis A2, the separator 40 includes a first corner 40A and a second corner 40B located on a diagonal line L1 of the separator 40 with respect to the first corner 40A. In this embodiment, in the cross section of the separator 40 including the second center axis A2, the length of the diagonal line L1 is greater than or equal to an outer diameter L2 of the separator 40. The "outer diameter L2" herein means a maximum diameter of the separator 40, that is, the outer diameter of the first annular surface 44 or the second annular surface 45. From another point of view, each separator 40 has a size larger than a size with which the separator 40 can fall down (i.e., size with which the separator 40 can rotate by 90° or more in the cross section of FIG. 2) when being located between two cylindrical rollers 30. Further, the separator 40 may have a size less than or equal to 1.1 times the size with which the separator 40 can fall down between two cylindrical rollers 30, in both the radial direction and the axial direction. As illustrated in FIG. 5, in the cross section of the separator 40 including the second center axis A2, the diagonal line L1 does not pass through any of the first recess 41 and the second recess 42.

As illustrated in FIG. 3, each of the separators 40 is sandwiched between the cylindrical rollers 30 at both sides of the separator 40 in the circumferential direction such that the groove wall surface 46 contacts the cylindrical rollers 30. Accordingly, as illustrated in FIG. 2, the outer peripheral surface of the separator 40 faces the fourth contact surface 23B and is separated from the second contact surface 13B, the first end surface in the direction in which the center axis (cylindrical axis) extends faces the first contact surface 13A, and the second end surface opposite to the first end surface faces the third contact surface 23A.

As described above, in the bearing 1 according to this embodiment, the curvature radius r1 of the groove wall surface 46 of each separator 40 is larger than the curvature radius r2 of the outer peripheral surface 30A of each cylindrical roller 30. Thus, as compared to a case where the curvature radius r1 of the groove wall surface 46 is equal to the curvature radius r2 of the outer peripheral surface 30A of the cylindrical roller 30, it is possible to reduce occurrence of damage such as indentation on the groove wall surfaces 46 of the separators 40 due to contact with the cylindrical rollers 30. Accordingly, the bearing 1 according to this embodiment can reduce damage of the separators 40. In addition, since the bearing 1 according to this embodiment employs the separators 40 smaller in size than the cylindrical rollers 30, the number of the cylindrical rollers 30 can be increased. This can also enhance load bearing performance of the bearing 1.

Other embodiments will now be described.

In the embodiment described above, the case where the first raceway member 10 has an annular shape has been described as an example. However, the present disclosure is not limited to this example. The first raceway member may be a stud, for example. That is, the bearing according to the present disclosure is also applicable to a cam follower.

In the bearing 1 according to the above embodiment, an inlet for placing the cylindrical rollers 30 in the rolling path formed between the first raceway surfaces 13 and the second raceway surfaces 23 may be formed through the second raceway member 20 in the radial direction D2. In this case, this inlet is closed with a lid (not shown). The lid may be fixed to the second raceway member 20 by a fixing member such as a pin.

In the above embodiment, the case where the cylindrical rollers 30 and the separators 40 are alternately arranged in the entire raceway has been described as an example, but the present disclosure is not limited to this example. For example, the plurality of separators 40 may be disposed between two cylindrical rollers 30 arranged in the circumferential direction.

In the above embodiment, the case where the outer peripheral surface 43 of each separator 40 includes the first annular surface 44 and the second annular surface 45 as well as the groove wall surface 46 has been described as an example, but the present disclosure is not limited to this example. For example, the entire outer peripheral surface 43 of each separator 40 may be the groove wall surface 46.

In the above embodiment, the case where the length of the diagonal line L1 of each separator 40 is greater than or equal to the outer diameter L2 of the separator 40 has been described as an example, but the present disclosure is not limited to this example. The length of the diagonal line L1 may be equal to the outer diameter L2, or may be less than the outer diameter L2. In each separator 40, one or both of the first recess 41 and the second recess 42 may be omitted.

It should be understood that the embodiments disclosed here are illustrative and non-restrictive in every respect. The scope of the present disclosure is defined by the terms of the claims, rather than the description above, and is intended to include any modifications within the scope and meaning equivalent to the terms of the claims.

The invention claimed is:

1. A bearing comprising:
a first raceway member whose outer peripheral surface includes an annular first raceway surface;
a second raceway member whose inner peripheral surface includes an annular second raceway surface facing the first raceway surface;
a plurality of cylindrical rollers arranged in a circumferential direction such that the cylindrical rollers contact the first raceway surface and the second raceway surface in an annular rolling path along the first raceway surface and the second raceway surface; and
a separator adjacent to the cylindrical rollers in the circumferential direction,
the separator having a cylindrical shape,
an outer peripheral surface of the separator having an annular groove defined by a groove wall surface, a shape of the groove wall surface in a cross section including a center axis of the separator being an arc shape,
the separator being oriented such that the groove wall surface contacts outer peripheral surfaces of the cylindrical rollers adjacent to the separator in the circumferential direction,
the groove wall surface having a curvature radius larger than a curvature radius of the outer peripheral surface of each cylindrical roller.

2. The bearing according to claim 1, wherein
in the cross section of the separator including the center axis, the separator includes:
a first corner, and
a second corner located on a diagonal line of the separator with respect to the first corner, and
in the cross section of the separator including the center axis, a length of the diagonal line is greater than or equal to an outer diameter of the separator.

3. The bearing according to claim 2, wherein
the first raceway surface includes:
a first contact surface to contact the outer peripheral surfaces of the cylindrical rollers, and
a second contact surface to contact end surfaces of the cylindrical rollers, the second contact surface being orthogonal to the first contact surface,
the second raceway surface includes:
a third contact surface to contact the outer peripheral surfaces of the cylindrical rollers, and
a fourth contact surface to contact end surfaces of the cylindrical roller, the fourth contact surface being orthogonal to the third contact surface, and
the separator is sandwiched between the cylindrical rollers disposed on both sides of the separator in the circumferential direction with the groove wall surface being in contact with the cylindrical rollers such that the outer peripheral surface faces the fourth contact surface and is separated from the second contact surface, a first end surface of the separator in a direction in which the center axis extends faces the first contact surface, and a second end surface opposite to the first end surface faces the third contact surface.

4. The bearing according to claim 3, wherein the plurality of cylindrical rollers are arranged in a plurality of lines separated from one another in a width direction.

5. The bearing according to claim 2, wherein the plurality of cylindrical rollers are arranged in a plurality of lines separated from one another in a width direction.

6. The bearing according to claim 1, wherein the first raceway surface includes:

a first contact surface to contact the outer peripheral surfaces of the cylindrical rollers, and a second contact surface to contact end surfaces of the cylindrical rollers, the second contact surface being orthogonal to the first contact surface, the second raceway surface includes:

a third contact surface to contact the outer peripheral surfaces of the cylindrical rollers, and a fourth contact surface to contact end surfaces of the cylindrical roller, the fourth contact surface being orthogonal to the third contact surface, and the separator is sandwiched between the cylindrical rollers disposed on both sides of the separator in the circumferential direction with the groove wall surface being in contact with the cylindrical rollers such that the outer peripheral surface faces the fourth contact surface and is separated from the second contact surface, a first end surface of the separator in a direction in which the center axis extends faces the first contact surface, and a second end surface opposite to the first end surface faces the third contact surface.

7. The bearing according to claim 6, wherein the plurality of cylindrical rollers are arranged in a plurality of lines separated from one another in a width direction.

8. The bearing according to claim 1, wherein the plurality of cylindrical rollers are arranged in a plurality of lines separated from one another in a width direction.

\* \* \* \* \*